Jan. 24, 1950  R. E. RUMMINS  2,495,387
MILL
Filed Jan. 3, 1946  8 Sheets-Sheet 3
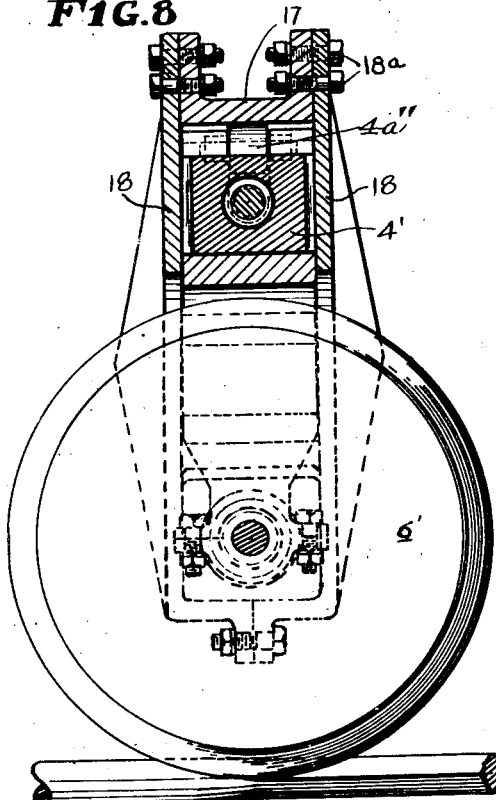
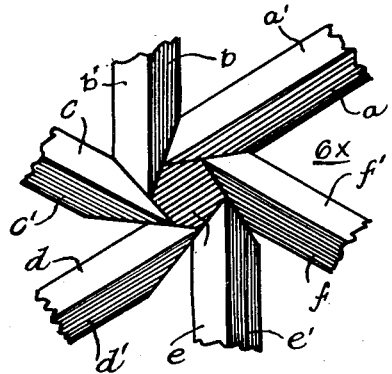
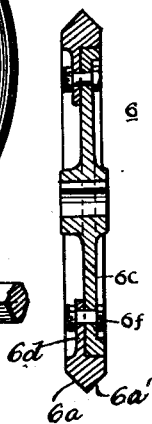
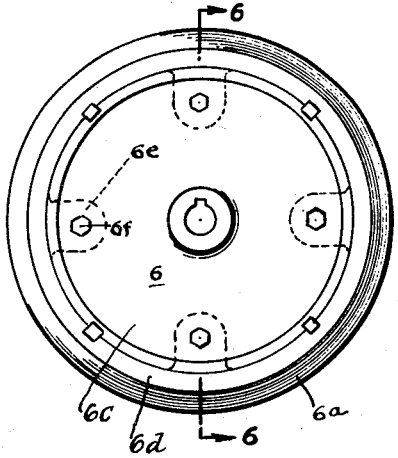
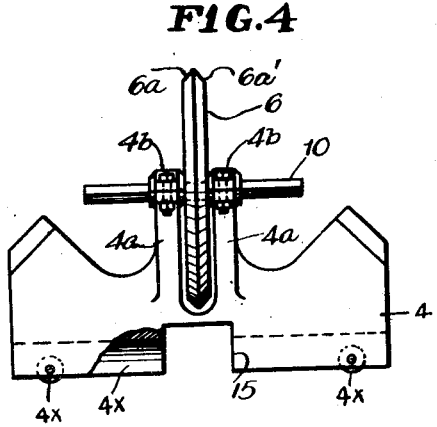
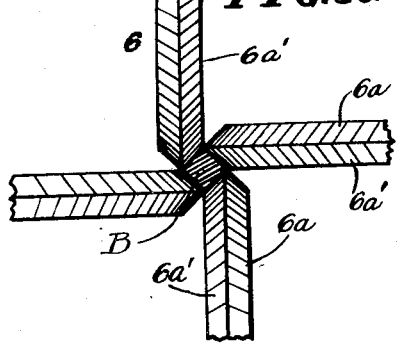
INVENTOR.
RICHARD E. RUMMINS.
BY Geo. B. Pitts
ATTORNEY.

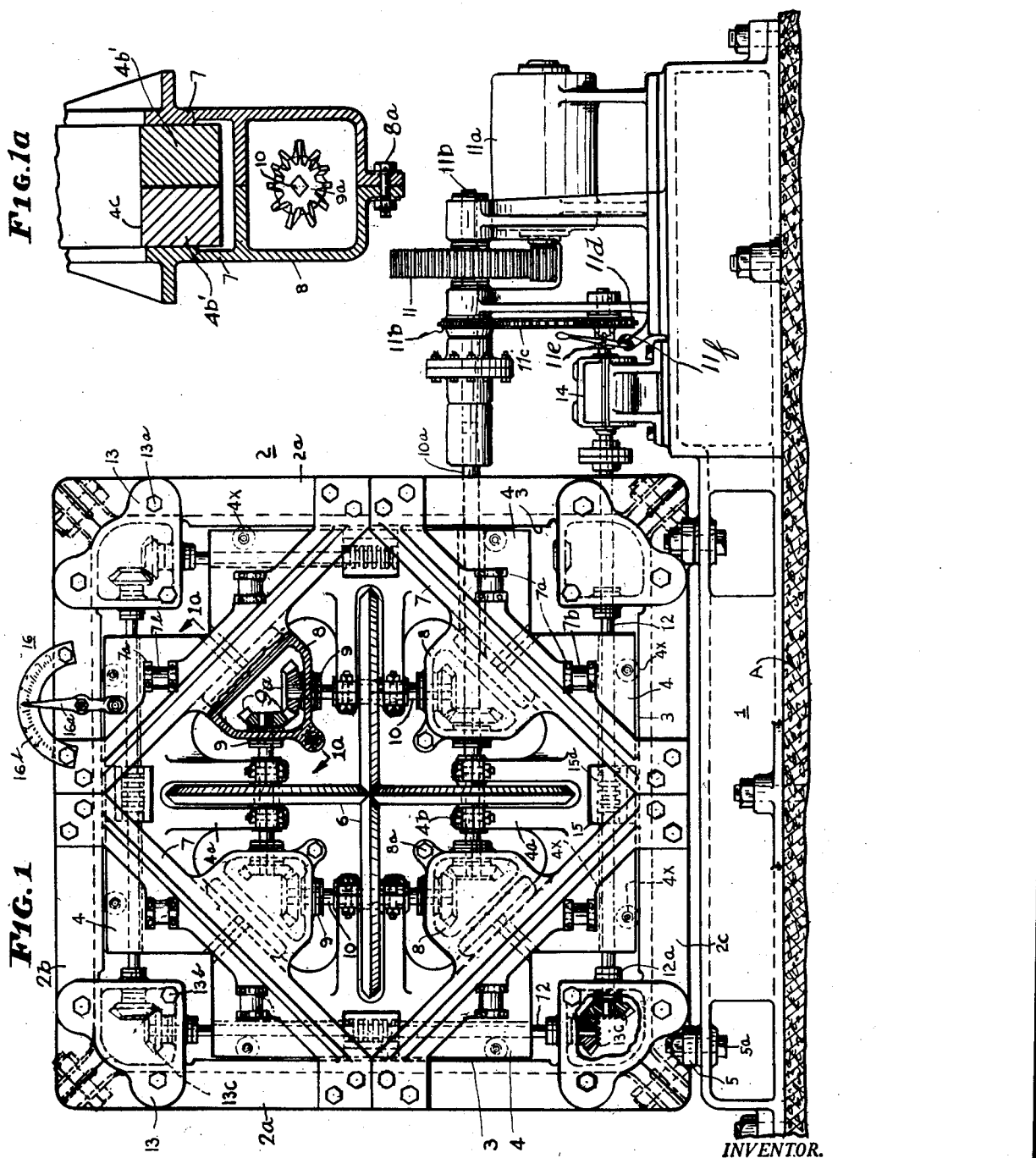

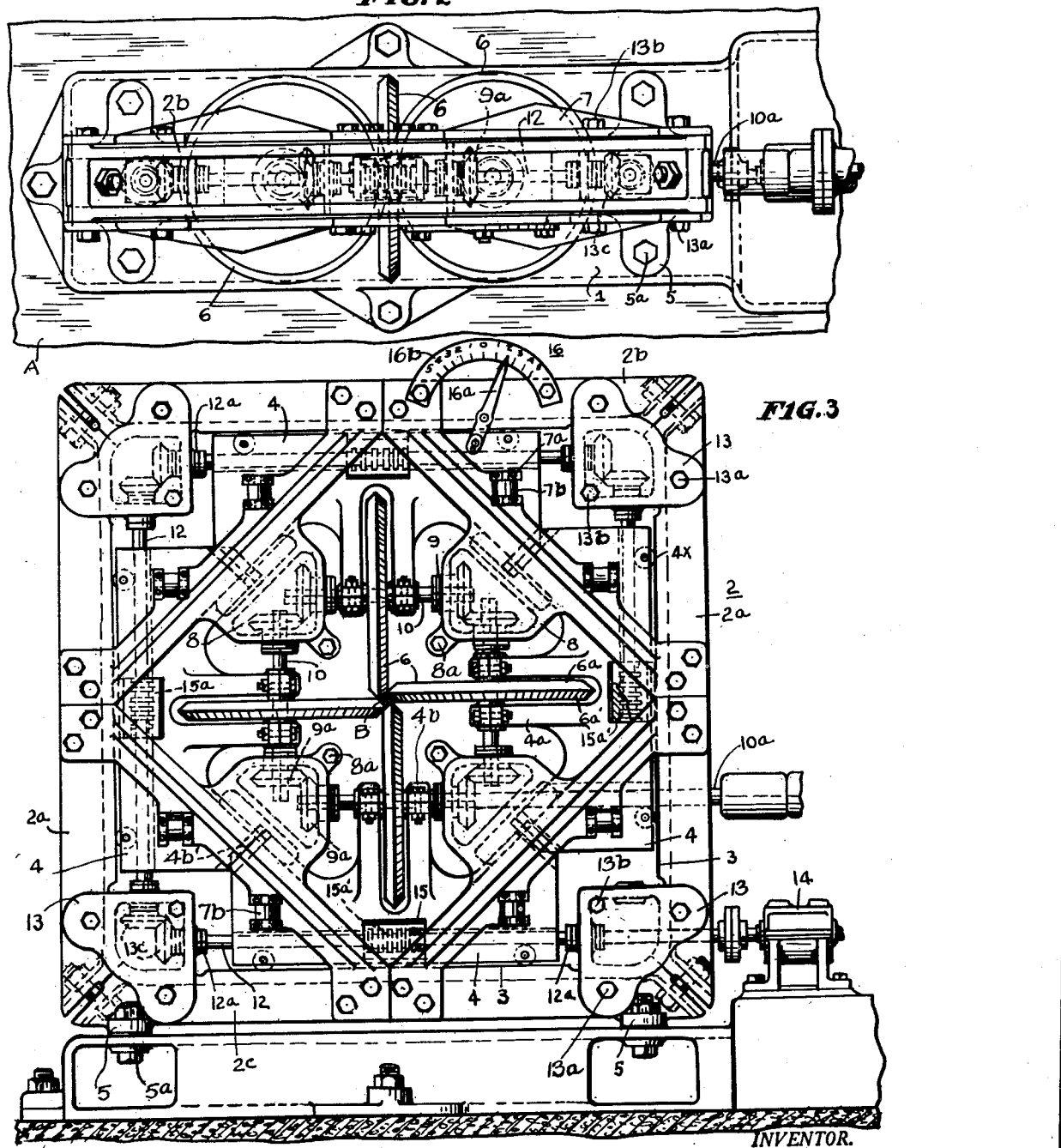

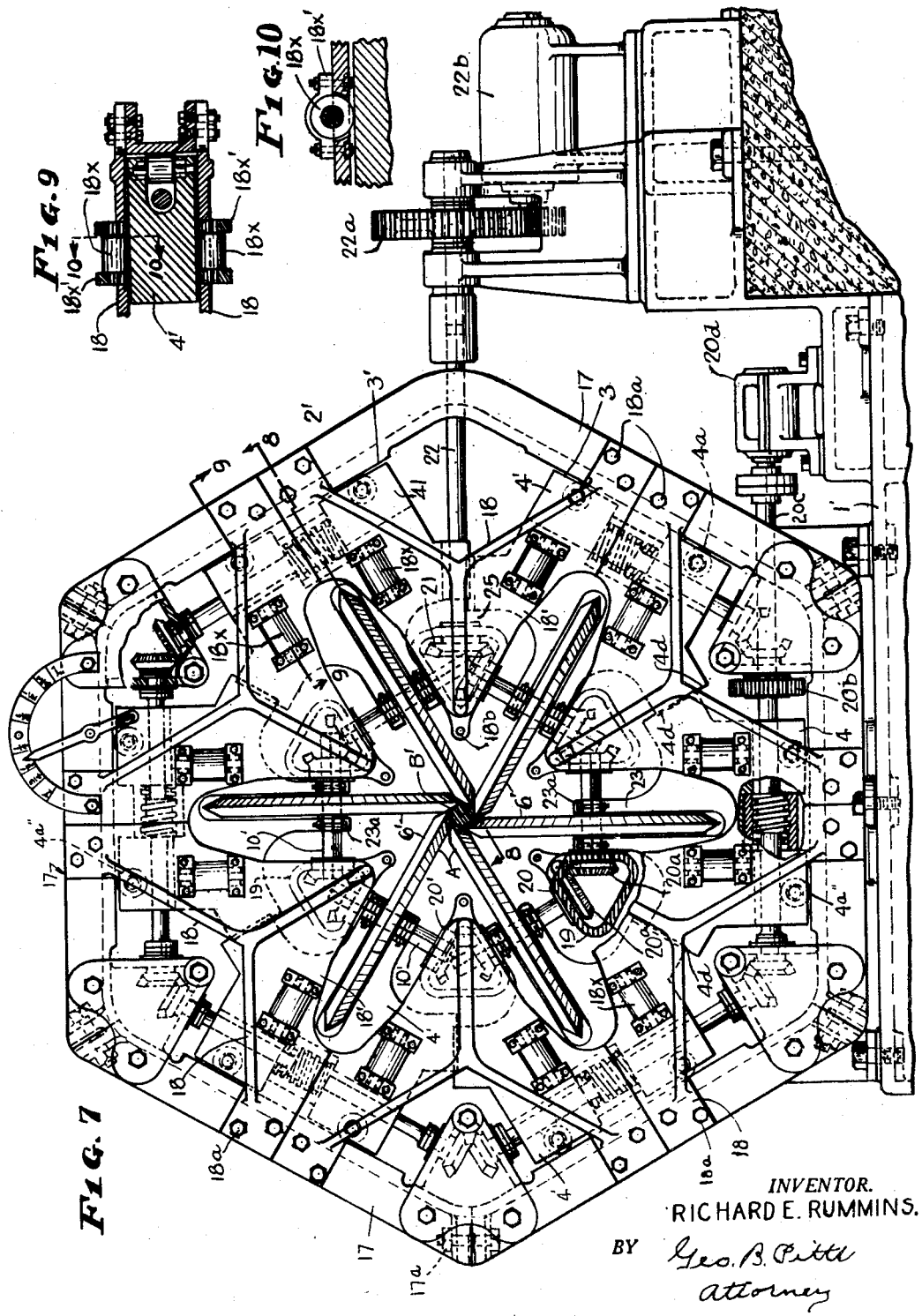

Jan. 24, 1950  R. E. RUMMINS  2,495,387
MILL
Filed Jan. 3, 1946  8 Sheets-Sheet 5

INVENTOR.
RICHARD E. RUMMINS.
BY Geo. B. Pitts
  Attorney

INVENTOR.
RICHARD E. RUMMINS.
BY Geo. B. Pitti
Attorney

Jan. 24, 1950 R. E. RUMMINS 2,495,387
MILL
Filed Jan. 3, 1946 8 Sheets-Sheet 7

INVENTOR.
RICHARD E. RUMMINS.
BY Geo. B. Pitts
ATTORNEY.

Jan. 24, 1950   R. E. RUMMINS   2,495,387
MILL
Filed Jan. 3, 1946   8 Sheets-Sheet 8

INVENTOR.
RICHARD E. RUMMINS.
BY Geo. B. Pitts
  Attorney

Patented Jan. 24, 1950

2,495,387

UNITED STATES PATENT OFFICE 2,495,387

MILL

Richard E. Rummins, Massillon, Ohio

Application January 3, 1946, Serial No. 638,808

6 Claims. (Cl. 80—34)

This invention relates to a mill for rolling stock supplied in solid or hollow form into predetermined cross sectional shapes. The mill embodying my invention is primarily intended to roll stock formed of metal and/or alloys of metal, but is equally adapted to other materials or compositions of material which are capable of being predeterminately shaped in cross section under pressure.

The invention may be applied to the production of wire, bars, rods, tubing, ingots and gears. While I have shown herein one set of working rolls, two or more sets may be employed dependent on the size and character of the product to be produced. Also, the driving means for the rolls may be operated to reverse the direction of rotation thereof to effect a pass and re-pass therethrough of the stock.

One object of the invention is to provide an improved rolling mill which has large capacity and may be readily adapted to roll hot or cold stock into different predetermined shapes in cross section.

Another object of the invention is to provide an improved rolling mill having a mounting for a set of rolls in which the number of rolls constituting a set may be increased or diminished, whereby stock having various shapes in cross section may be produced; for example, the mounting for the rolls may be constructed to support any predetermined number thereof, so that the full complement of rolls or a lesser number thereof may be employed, dependent on the desired cross sectional shape of the rolled or finished stock.

Another object of the invention is to provide an improved rolling mill having a simplified construction, which has large capacity and may be readily adapted to roll hot or cold stock into varying shapes or sizes in cross section.

Another object of the invention is to provide an improved rolling mill comprising a set of rolls, each having an active work engaging face disposed at an angle inclined to the plane of the roll, and arranged to simultaneously engage the work in a plane cutting the axes of the rolls.

Another object of the invention is to provide a mill having related rolls adapted to roll stock into polygonal shape in cross section, each roll having active work engaging faces each disposed at an angle inclined to the plane of the roll and adjustable axially, whereby the respective corresponding faces of the rolls may be positioned for carrying out rolling operations.

Another object of the invention is to provide an improved mill for rolling stock, supplied in solid or hollow form, adapted to provide a product having exterior angularly related faces or sides, wherein adjacent sides may be disposed at different or similar angles and/or said sides may differ in width or be of equal width.

Another object of the invention is to provide an improved mill for rolling stock into a predetermined shape in cross section by means of adjustable driven rolls and power means are provided for simultaneously adjusting all of the rolls to change the relationship of their active faces.

Another object of the invention is to provide an improved mill for rolling stock to provide a rolled product of polygonal shape in cross section, wherein all of the sides of product may be of equal width, respective opposite sides thereof may be of equal width or all of the sides or certain thereof may be of different widths.

Another object of the invention is to provide an improved rolling mill consisting of relatively movable work engaging rolls, means for driving the rolls to feed stock relative thereto and means for simultaneously bodily moving the rolls axially during feeding of the stock.

Another object of the invention is to provide an improved apparatus having a set of related adjustable rolls adapted to carry out roughing operations on bars, ingots, billets, rods and the like and finishing operations thereon, whereby dies, draw-benches and the labor for operating these mechanisms are eliminated.

Another object of the invention is to provide an improved rolling mill employing a set of related adjustable rolls, each having two active faces, so that when corresponding faces become worn, the rolls may be adjusted to position the other corresponding faces for operation, thereby increasing the life of the rolls without disassembly thereof.

Other objects of the invention will be apparent to those skilled in the art to which my invention relates from the following description taken in connection with the accompanying drawings, wherein Fig. 1 is an elevational view of a mill embodying my invention.

Fig. 1a is a fragmentary section on the line 1a—1a of Fig. 1.

Fig. 2 is a top plan view.

Fig. 3 is a view similar to Fig. 1, but showing the rolls relatively spaced and engaging work.

Figure 3a is an enlarged view showing the rolls relatively spaced and engaging the work.

Fig. 4 is an elevational view showing a roll, its adjusting device and drive shaft (the gears for driving the shaft being omitted).

Fig. 5 is a side elevation of one of the working rolls.

Fig. 6 is a section on the line 6—6 of Fig. 5.

Fig. 7 is an elevational view showing a modification.

Figs. 8 and 9 are fragmentary sections on the lines 8—8 and 9—9, respectively, of Fig. 7.

Fig. 10 is a fragmentary section on the line 10—10 of Fig. 9.

Figure 11:
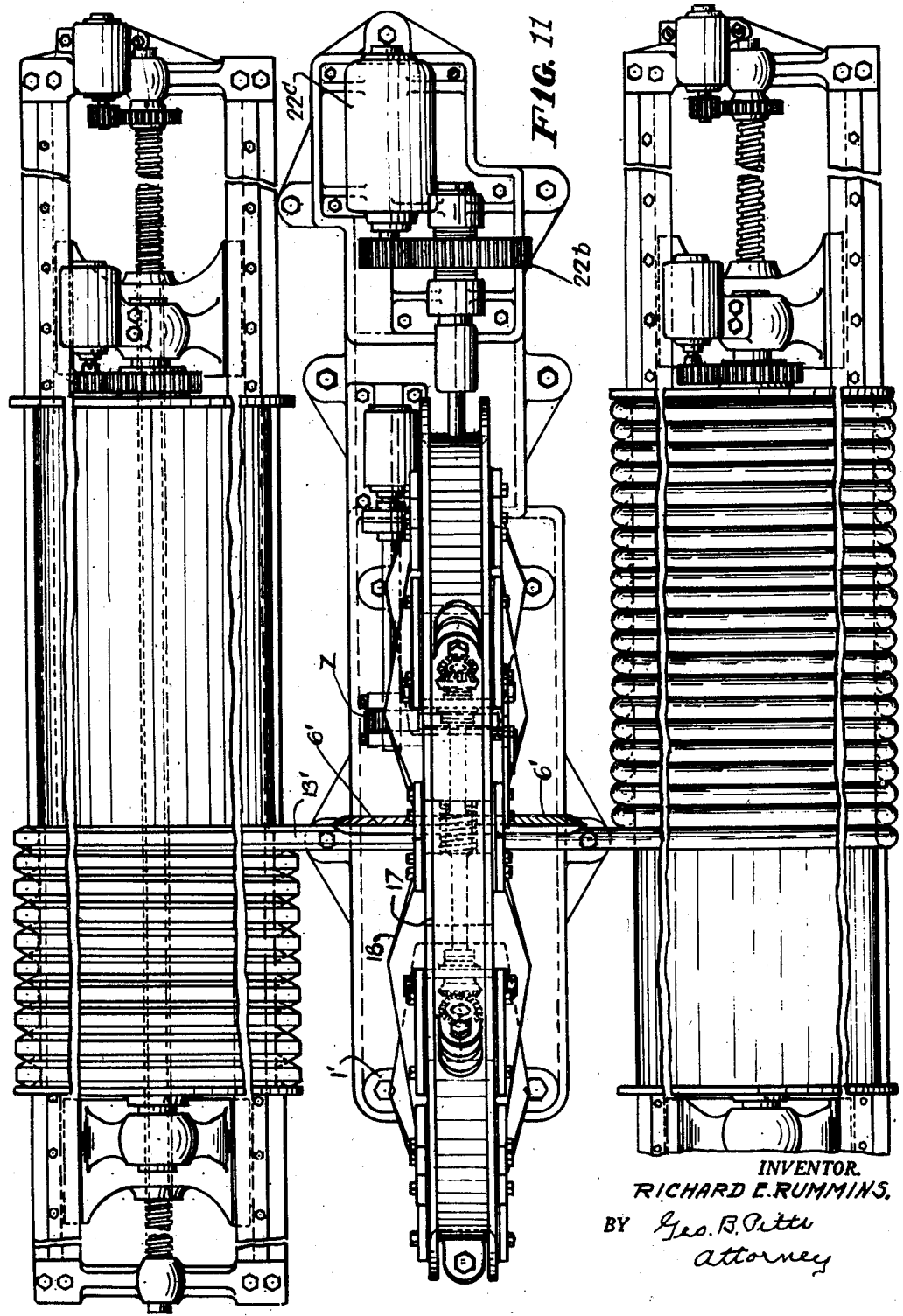

Fig. 11 is a plan view of the mill shown in Fig. 7 and also suitable apparatus for supplying a work, such as wire, to the mill and suitable apparatus for coiling the work after passing through the mill.

Figure 12:
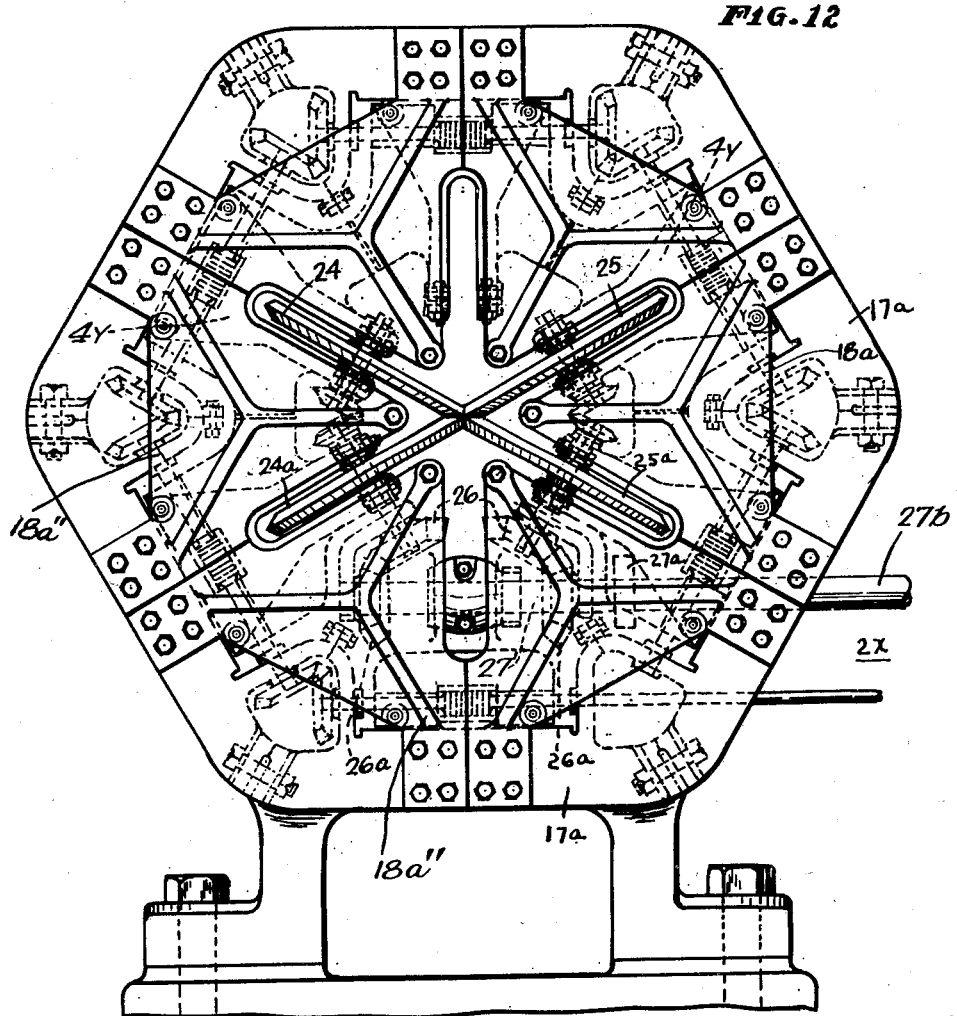

Fig. 12 is an elevational view similar to Fig. 7 but embodying certain modifications.

Figure 13:
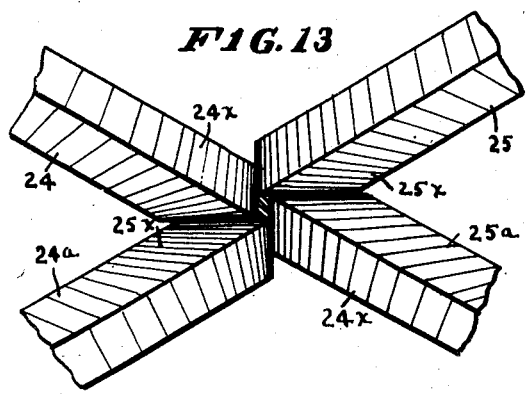

Fig. 13 is a fragmentary view of parts shown in Fig. 12, enlarged.

Figure 14:
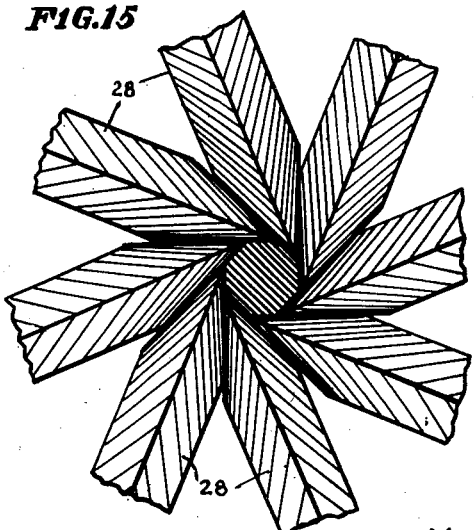

Fig. 14 shows a group of eight rolls for rolling stock into octagon shape in cross section.

Figure 15:
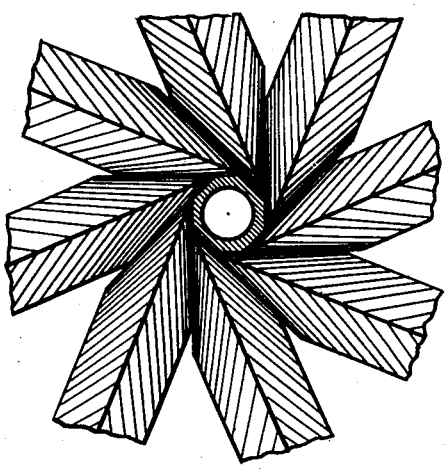

Fig. 15 is a view similar to Fig. 14 applied to tubular stock.

Fig. 16 illustrates a roll set of modified form.

Figure 17:
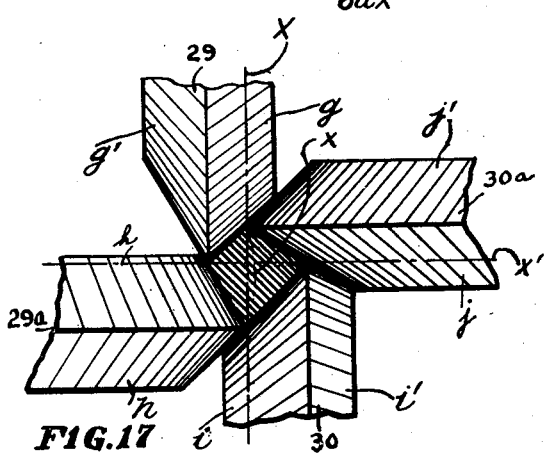

Fig. 17 illustrates a set of four rolls for rolling a work piece.

Figure 18:
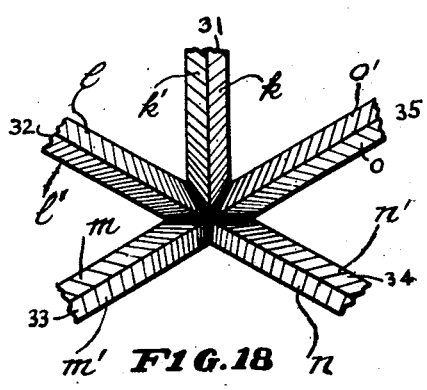

Fig. 18 illustrates a roll set consisting of five rolls.

Figure 19:
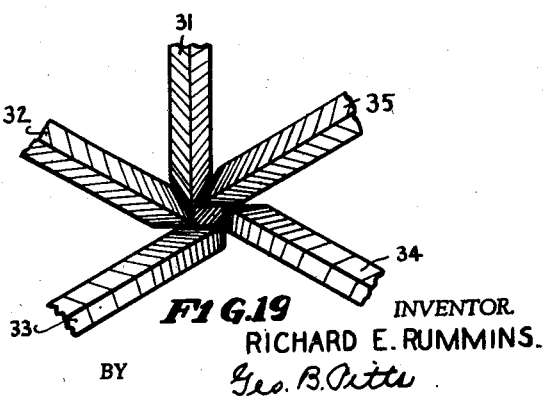

Fig. 19 is a view similar to Fig. 18, but showing the rolls adjusted and engaging the work to roll a bar of irregular shape in cross section.

Figure 20:
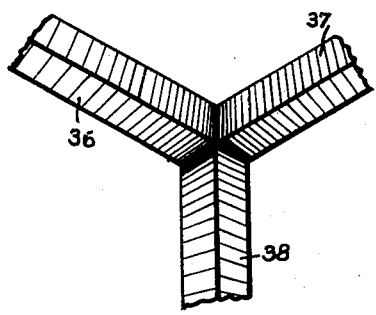

Figure 20 illustrates a roll set consisting of 3 rolls spaced at 120° angles.

Figure 21:
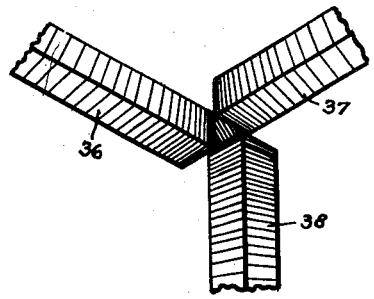

Figure 21 illustrates a roll set consisting of 3 rolls spaced and engaging the work with the active faces over each roll disposed at a 60° angle.

Figure 22:
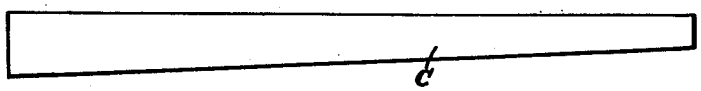
Figure 22A:

Figures 22 and 22a show a rolled section square in cross section and tapered from end to end.

Figure 23:
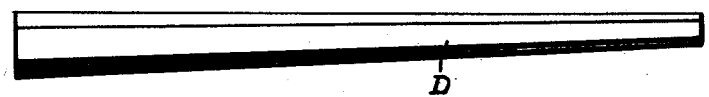
Figure 23A:

Figures 23 and 23a show a rolled section hexagonal in cross section and tapered from end to end.

Referring to Figs. 1, 2, 3, 3a, 4, 5 and 6, 1 indicates as an entirety a base suitably anchored to flooring A and rigidly supporting a frame indicated as an entirety at 2. The frame 2 herein shown for illustrative purposes, consists of side members 2a, a top member 2b and a bottom member 2c, each member preferably being of U-shape in cross section and having end walls suitably bolted to the end walls of adjacent members. The bottom member 2c is provided with lugs 5 which are rigidly secured to the base 1 by bolts 5a. The sides of the members 2a, 2b, 2c, extend outwardly, so that the inner faces of the bottom walls of these members form ways 3 for movable devices 4, each of which is operatively connected to one of the work engaging rolls 6 for adjusting the latter axially, or moving it during each rolling operation, as later set forth.

As shown in these views and as will be apparent from the description of the disclosed modifications hereinafter set forth, the mounting for the working rolls 6 is constructed to provide ways 3 for movable devices corresponding in number to the number of working rolls that may be required for producing any predetermined type of product, including gears, rods, billets, ingots, bars, wire and the like. That is, to meet various demands for rolled stock, the mounting may provide for the employment of six, eight or more rolls and ways for movable devices, one for each roll, but permit the employment of a lesser number of rolls so that in carrying out my invention, the mounting may be adapted to accommodate a predetermined maximum number of rolls or a lesser number thereof, as circumstances require. In producing gears, two or more sets of rolls are employed. The rolls in each set are disposed radially and the sets of rolls compress the metal of the stock progressively until the gear teeth thereof are in final shape, and thereafter the stock is transversely cut into sections having the desired width. In such application of the invention, a large number of gears can be readily and economically made, as each gear does not have to be separately handled and the teeth thereof milled or ground. In the production of products of polygonal shape in cross section, all of the sides thereof may be of equal width, certain sides only may be of equal width or all of the sides or certain thereof may be of unequal width. As the rolls are separately adjustably mounted, the size of the product in cross section may be varied without disassembly of the rolls; also, as each roll is provided with two work engaging faces, (a) one set of corresponding active faces may be employed for roughing the stock and upon adjustment of the rolls the other set of corresponding active faces may be employed for finishing the stock or (b) when one set of active faces becomes worn the rolls may be adjusted to correlate the other set of active faces in rolling position, so that disassembly of the rolls, loss of time and extra labor are eliminated.

7 indicates cross members disposed at each side of the frame 2, each thereof extending from one of the frame members 2a, 2b, 2c, to an adjacent frame member, the opposite ends of each cross member being rigidly but removably secured to the sides of adjacent frame members; each cross member 7 on one side of the frame 2 being related to a cross member on the opposite side thereof.

Each of the cross members 7 is provided with pairs of standards 7a supporting rollers 7b, each roller on one cross member 7 being alined with a roller 7b on the related cross member on the remote side of the frame 2. In the arrangement shown, two rollers 7b and their alined rollers, respectively, engage each movable device 4 at opposite sides of the adjacent roll 6 to guide the device 4 on the adjacent way 3 and eliminate friction between them and the cross members when the devices are moved on the way 3, as later set forth. I preferably provide two or more supporting rollers 4x between each device 4 and its way 3. The rollers 4x are mounted in a recess 4x' formed in the bottom wall of each device 4.

As shown (see particularly Fig. 4), the opposite ends 4c of each movable device 4 are disposed in planes coincident with the planes of the active faces, respectively, of the adjacent roll 6 and have sliding engagement with the adjoining ends 4c of adjacent movable devices 4, when adjustment of the rolls is made, whereby all of the devices are in connected relation and co-operate with the ways 3 to resist back pressure of the rolls during operation of the latter. As later set forth, where the faces of a roll are disposed at different angles, the end walls 4c for the movable device, which is related to said roll, are disposed in planes coincident with those faces, respectively.

By preference the opposite outer end portions of each device 4 are cut away to form an extension 4b' which overlaps and slides relative to the extensions 4b' on the end portions of adjacent devices (see Fig. 1a), such overlapping extensions serving to supplement the function of the rollers 7b in guiding the devices 4 on their ways 3. Intermediate the ends of each cross member 7, it is provided with a housing section which forms with the housing section on the related cross member 7a box 8, the walls of which support suitable bearings 9. The sections of each box 8 are secured together by bolts 8a. The bearings 9 in each box rotatably support the hubs of miter gears 9a and prevent axial movement of the latter, and these gears in turn support the adjacent ends of shafts 10, to each of which one of the rolls 6 is keyed. In the arrangement shown in these views, I provide four shafts 10 disposed in a plane transverse to the feed of the work B. In the form of construction being described, each shaft 10 is mounted at right angles to the adjacent shafts. The opposite end portions of each shaft 10 are square in cross section and slidably fit similarly shape openings formed in the hubs of the adjacent gears 9a, to provide a driving connection therewith, but permits the shaft to be slid or adjusted endwise to adjust the adjacent roll axially for the purposes above referred to. As the gears 9a in each box 8 are in mesh and one of the shafts 10 is extended, as shown at 10a, and driven through a suitable reduction gearing 11 by a motor 11a, all of the rolls are simultaneously driven to roll the stock to a predetermined shape in cross section.

Each movable device 4 is provided with a pair of inwardly extending spaced posts 4a disposed at opposite sides of the adjacent roll 6 and terminating in pillow blocks 4b, through which the adjacent roll shaft extends. The pillow blocks 4b engage the opposite sides of the roll hub, so that movement of the adjacent device on its way 3 will adjust the roll axially. The spaced posts 4a serve to resist pressure imparted to the shafts 10 due to operation of the rolls 6 in rolling the work.

The periphery of each roll 6 is preferably provided with two active work engaging faces 6a, 6a', inclined from the lateral sides of the roll upwardly and inwardly. In Figs. 1, 2, 3 and 3a, the roll faces 6a, 6a', are of equal width and disposed at an angle of 90°. Fig. 1 shows the rolls 6 in a non-rolling position with their active faces in engagement. From this position the rolls 6 may be simultaneously adjusted axially, respectively, in either direction to correlate all of the faces 6a or 6a' in work rolling position, as shown in Fig. 3. Accordingly, when the rolls 6 are adjusted axially, respectively, a predetermined distance, as shown in Figs. 3 and 3a, corresponding faces of rolls (faces 6a as shown in Fig. 3 and 3a) will be positioned to effect the rolling of the work or stock into square shape B in cross section. In this specific form of construction, the rolls are adjusted equal distances from their non-rolling position, dependent on the size of the rolled work; such adjustment being limited by the width of the faces 6a, 6a'.

Each of the rolls 6 may consist of a hub section 6c and a rim section 6d having inwardly extending lugs 6e which are detachably secured to the hub section by bolts 6f, the rim section being provided with the active work engaging faces 6a, 6a' (see Figs. 5 and 6).

The means for simultaneously moving all of the devices 4 on their ways 3 for adjusting the shafts 10 endwise and the rolls thereon consists of the following: 12 indicates a shaft mounted in and extending through the recess 4x' formed in the bottom wall of each movable device 4. The opposite ends of each shaft 12 are mounted in suitable bearings 12a supported in the walls of sectional housings 13, the latter being secured to the frame members 2a, 2b, 2c, adjacent their respective joints by bolts 13a and secured to each other by bolts 13b. The adjacent ends of the shafts 12 within the housings 13 are provided with miter gears 13c in meshing relation, so that by driving one shaft 12 by a reversible motor 14, all thereof are driven. Intermediate the opposite ends of each device 4, the recess 4x' is enlarged, as shown at 15, to form a seat to removably position a block 15a formed with a through opening, through which the adjacent shaft 12 extends, the wall of the opening being provided with a worm thread, in mesh with a worm 15a' fixed to the adjacent shaft 12, whereby the worm 15a', when driven, operates through the worm block 15a to move the adjacent device 4 along the adjacent way 3. As all of the shafts 12 are drivingly connected, as already set forth, these driving connections between the shafts 12 and devices 4 operate through the latter to adjust all of the rolls 6 simultaneously. By providing the rolls 6 with two active work engaging faces and making provision for their axial adjustment, it will be observed that either set of active faces may be correlated for rolling and when desired the rolls 6 may be simultaneously adjusted to position the other faces in operative relation, without any disassembly and reassembly operations of the rolls or their mountings.

It will also be seen that the active work engaging faces on the rolls may have a width equal to the maximum width of the sides of the shape to be rolled and that by adjustment of the rolls, stock having sides equal to or less than this maximum width may be rapidly produced.

In the arrangement now being referred to, the worm threads in the blocks 15a and worms have similar leads, whereby rotation of the shafts 12 will adjust the devices equal distances, but in rolling certain cross sectional shapes (later referred to), the leads of the threads in certain or all of the blocks 15a vary, so that while the shafts 12 are rotated equal distances, the movement of the movable devices 4 is regulated to effect the proper relative adjustment of the adjacent active faces of the rolls. Also, in this arrangement, the motor 14 is manually controlled and operated to set the work engaging rolls in a predetermined relation and to re-adjust them to another predetermined position; however, in rolling stock to produce products having tapered sides (see Figs. 22 and 23), as later set forth, the motor 14 is driven and the devices 4 are simultaneously moved while a rolling operation is taking place to provide a gradual, uniform inward movement of the work engaging rolls at a speed dependent upon the angle of the tapered sides of the product to be produced. As will be apparent, this movement of the rolls results from the coordination between the speed of revolution of the shafts 12 and the lead of the screw threads provided in the blocks 15a. Accordingly, provision is made to replace or change the blocks 15a and worms 15a' to meet these conditions.

16 indicates indicating means preferably consisting of a pointer 16a pivoted on the top frame member 2b, its inner end being operatively connected to the adjacent device 4, whereby movement of the latter rotates the pointer and swings its outer end relative to suitable graduations 16b provided on the adjacent frame member. The graduations 16b may be arranged to indicate the movement of the devices 4 or the adjustment of the rolls 6 relative to the non-rolling position of the latter or the position of the rolls for work having sides of different widths.

Figure 6A:
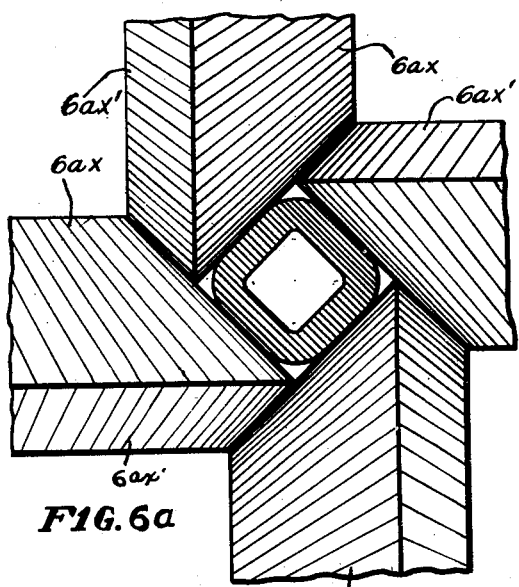
Fig. 6a is a view showing a modified form of rolls; also illustrating the rolling of hollow stock.

Fig. 6a illustrates a set of rolls for rolling stock into square shape in cross section, which rolls are disposed at a 90° angle and may be mounted as shown in Figs. 1, 2 and 3; as shown, the stock supplied to the rolls consists of a tube. In this modified form, each of the rolls 6 is provided with two active faces 6ax, 6ax', of different widths. In this form of roll construction, the rolls may be adjusted to correlate all of the faces 6ax or all of the faces 6ax', as already set forth in connection with Figs. 1, 2 and 3, but by making faces 6ax relatively wide as compared to the faces 6ax' and adjusting the rolls to correlate the faces 6ax in position for rolling stock, an increased range of adjustment of the rolls in one direction is provided for, as compared to rolls having active faces of equal width, to provide rolled stock having sides of varying widths; in other words, the maximum width of the sides of the rolled stock can be increased without substituting rolls having a wider rim.

Figure 7A:
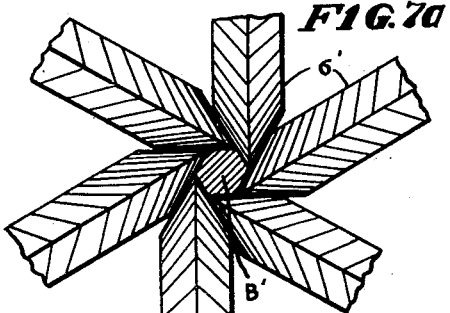
Fig. 7a is a fragmentary view of the rolls shown in Fig. 7, enlarged.

Fig. 7 illustrates a modified form of construction showing the employment of six work engaging rolls 6', disposed at a 60° angle, whereby the stock, when rolled, has six sides forming a rod or wire B' of hexagon shape in cross section (see Fig. 7a). In this view 2' indicates as an entirety a frame, which may be suitably mounted on a base 1'. The frame 2' consists of a plurality of members 17 of U-shape in cross section secured together end to end by bolts 17a. The frame members 17 are preferably shaped to provide six sides, whereby the inner walls of these members may be utilized as ways 3' for the rollers 4a" to provide one movable device 4' for each work engaging roll 6'. The opposite end walls 4d of each movable device 4' are disposed in planes coincident with the active faces of the adjacent roll 6'', and slidably engage the adjoining end walls 4d of adjacent devices 4' for reasons already set forth in connection with the devices 4. 18 indicates cross members disposed upon opposite sides of the frame 2', the opposite ends of each cross member 18 being removably secured to the adjacent frame members 17 by bolts 18a. The inner sides or faces of related cross members 18 are provided with pairs of alined rollers 18x, the peripheries of which engage the opposite sides of the devices 4' to guide them on the ways 3' and eliminate friction between them and the cross members 18, during movement of the devices 4' on the ways 3'. The opposite ends of each roller 18x are mounted in suitable bearings supported on the adjacent cross member by yokes 18x'. Each cross member 18x' (see Fig. 9) has an inwardly extending portion 18' disposed between adjacent rolls 6', which portion is provided with a housing section shaped to form with a housing section on the adjacent inwardly extending portion of the related cross member 18 at the opposite side of the frame 2', a gear housing 19. The inner ends of the inwardly extending portions of related cross members 18 are preferably secured together by bolts 18b. As shown, these inwardly extending portions are spaced to permit axial adjustment of the rolls 6', as later set forth. The walls of each housing 19 support suitable bearings 20 for the hubs of gears 20a. Each gear 20a on one side of each roll 6' and the related gear 20a on the opposite side thereof support the opposite end portions of a shaft 10', to which one of the rolls is keyed. The opposite end portions of each shaft 10' are preferably of square shape in cross section and extend through and slidably fit similarly shaped openings in the hubs of the adjacent gears 20a to provide a driving connection therewith, but permit the shaft 10' to slide endwise for adjustment of the adjacent roll.

The gears 20a which support the adjacent ends of the shafts 10' are in meshing relation, one of which meshes with a gear 21 fixed to a shaft 22, the latter in turn being driven through a suitable reduction gear 22a by a motor 22b.

Each of the movable devices 4' is provided with inwardly extending spaced posts 23, which terminate in pillow blocks 23a, engaging the opposite ends of the hub of the adjacent roll 6', and operate to adjust the roll axially and its shaft 10' endwise, when the adjacent device 4' is moved in either direction, as already set forth. As the adjacent roll shaft extends through and rotates in the pillow blocks 23a the latter operate to resist pressure on the shaft during the rolling operations.

The devices 4' are simultaneously moved by a power mechanism, the parts of which are similar to like parts shown in Figs. 1, 2 and 3, to adjust the rolls 6' predetermined equal or unequal distances, determined by the leads of the threads in the blocks 15a, dependent on the width of the sides of the stock to be produced. In this form of construction one of the shafts for moving the devices 4' is provided intermediate its ends with a gear 20b, in mesh with a gear (not shown) fixed to a shaft 20c, the latter in turn being driven by a motor 20d.

Fig. 11 illustrates one example of a mechanism for supplying stock to a set of rolls 6' mounted as shown in Fig. 7. This mechanism consists of a motor driven drum C on which the stock is coiled. From the drum C the stock feeds through and between the set of rolls 6' to a drum D on which the rolled stock B' is wound. The drums C and D are rotated and simultaneously moved endwise so that the stock is maintained in proper relation to the rolls. Similar mechanism may be associated with the form of construction shown in Figs. 1, 2 and 3. No claim is made herein to the uncoiling and re-coiling mechanisms as they form no part of the present invention.

Fig. 12 illustrates a modified form of construction wherein the frame, indicated as an entirety at 2x, consists of endwise related members 17a provided at its opposite sides with cross members 18a''. This view (as well as Fig. 7) illustrates an arrangement providing for a predetermined number of rolls dependent on the maximum number of sides of the rolled stock that may be required, but adapted to accommodate a lesser number of rolls to meet different operating requirements. For illustrative purposes, the frame 2x will accommodate six adjustable work engaging rolls, but it may also accommodate five adjustable work engaging rolls (see Fig. 18 and 19) as well as four adjustable work engaging rolls 24, 24a, 25, 25a, as shown. In changing the arrangement from a six roll set to a five roll set (Fig. 18), one roll is omitted or removed and in changing the arrangement to a four roll set two oppositely related rolls are omitted or removed. However, as will be evident from Fig. 12, in making these changes the movable device 4y for each omitted roll and adjustment means for the device are retained, whereby the adjustment of the devices 4y related to the rolls to be employed may be effected. In Fig. 12 the active faces on each roll are disposed at different angles as compared to the angles of the faces on the rolls shown in Figs. 1 and 3. The rolls 24, 24a, and rolls 25, 25a, are disposed at 30° angles, respectively, whereas rolls 24 and 25 and rolls 24a and 25a are disposed at 60° angles, respectively. Accordingly, this arrangement provides for rolling stock of rectangular shape in cross section (see Fig. 13). In this illustrated arrangement, the active faces of the rolls 24, 25a and designated 24x are related and the active faces of the rolls 24a, 25, and designated 25x are related, whereby the rolls may be adjusted to roll stock the adjacent sides of which have different widths and the respective opposite sides are of equal width, as shown in Fig. 13. Where the rolling operation calls for a roll set less than the full complement of the frame and it is found desirable to make changes in the roll set, the driving connections for the roll shafts may be modified; that is, in the illustrated example (Fig. 12), the shaft between the shafts for the rolls 24 and 25 may be omitted and the adjacent ends of the shafts for the rolls 24a, 25a are provided with gears 26 which mesh with gears 26a fixed to a shaft 27, the latter in turn being provided with a gear (not shown) in mesh with a gear 27a on a shaft 27b, which is driven by a suitable motor (not shown).

The shafts for the rolls 24, 24a, 25, 25a, are simultaneously adjusted by means, the parts of which are similar to like parts shown in Figs. 1, 2, 3 and 7.

Fig. 14 illustrates a set of eight work engaging rolls 28 disposed at a 45° angle, whereby the rolled product has eight sides. Each roll 28 is adapted to be adjustably mounted in the manner already set forth. Fig. 15 is similar to Fig. 14, but shows the application of the rolls to a tube or hollow stock.

Fig. 16 illustrates a group of rolls 6x (preferably six rolls) disposed at equal angles, but each having active work engaging faces disposed at different angles; that is, corresponding active faces of certain of the rolls are at different angles as compared to the corresponding faces of other rolls, namely, corresponding faces, a, b, c, d, e, f, of the rolls are disposed at the following angles; 20, 20, 20, 40, 40, 30, respectively, whereas the other corresponding faces a', b', c', d', e', f', are disposed at the following angles; 40, 40, 20, 20, 40, 30, respectively. In this form of roll construction, predetermined sides of the rolled stock $B^2$ will vary in width with respect to other sides thereof.

Fig. 17 shows a group of four rolls 29, 29a, 30, 30a, adapted to be adjustably mounted in a frame such as shown in Figs. 1, 2 and 3. In this form of construction, corresponding faces g, h, i, j of the rolls are disposed at 45, 60, 45, 30, angles, respectively, and the other corresponding faces g', h', i', j', are disposed at 30, 45, 60, 45 angles, respectively, and adapted to roll stock into a trapezoid in cross section.

Figs. 18 and 19 show a group of five rolls 31, 32, 33, 34, 35, adapted to be adjustably mounted in a frame as shown in Figs. 7 and 12, as already set forth. The corresponding active faces k, l, m, n, o, of the rolls are disposed at angles 30, 30, 60, 30, 30, respectively, whereas the corresponding active faces k', l', m', n', o', are disposed at angles 30, 30, 60, 30, 30 respectively. Fig. 18 shows the rolls in non-rolling position whereas Fig. 19 shows the rolls adjusted to roll stock into specific shape in cross section.

Fig. 20 illustrates a roll set consisting of three, uniformly spaced rolls at 120° angles adapted to be mounted in a frame having three ways 3 or a frame having six ways, as shown in Fig. 7, whereas Fig. 21 shows the rolls spaced and engaging the work. The active faces on each roll are disposed at a 60° angle.

Figs. 22 and 23 show a rolled section C formed of suitable material, square in cross section and tapered from end to end, whereas Figs. 23 and 23a show a rolled section D, of hexagon shape in cross section and tapered from end to end.

In rolling stock to produce tapered sections as shown, the section of material has a length determined by the elongation which results in reducing the cross sectional area toward the smaller end. The work engaging rolls are adjusted to engage the advancing end of the section and blocks 15a and worms 15a' having a lead dependent on the taper to be provided in the section of material, are provided in the movable devices, so that when the motor 14 is driven the shafts 12 will effect a movement of the devices on their ways in co-ordinated relation to the feed of the section by the work engaging rolls. The motors 11a and 14 are then driven to drive the work engaging rolls and operate the movable devices, which operation moves the rolls axially and the latter feed the section of material endwise. As will be observed, the axial movement of the rolls is effective to gradually move the work engaging faces thereof into closer relation, whereby the cross sectional taper of the stock results as the rolling operation takes place. If a second pass is required to roll the section to a predetermined size in cross section from end to end, the motors 11a and 14 are reversed to rotate the rolls and move the devices in the opposite direction, whereby the section of material is moved endwise rearwardly and the rolls and devices are re-set into their first position; next the motors are stopped and motor 14 is driven in the first direction to re-set the work engaging rolls in position for the second pass; next, the motors 11a and 14 are driven in the first direction and the section of material introduced into the rolls to effect the second pass. These operations are repeated where additional passes are required.

When it is desired to synchronize the speed of the shafts 10a and 12, in producing sections that are tapered from end to end or throughout a portion of their length, I provide a driving connection between these shafts, as shown in Fig. 1, such connection preferably consisting of the following: 11b indicates a sprocket fixed to the shaft 11b driven by the motor 11a. 11c indicates a chain engaging the sprocket 11b and a sprocket 11d free to rotate on the extended portion of the shaft for the motor 14 and provided with clutch elements. 11e indicates a collar slidably and non-rotatably mounted on the extended portion of the shaft for the motor 14 and provided with clutch elements adapted to engage and disengage the clutch elements on the sprocket 11d. 11f indicates a lever operatively connected to the collar 11e for sliding it on the adjacent shaft, to connect the collar to the sprocket 11d and effect driving of the adjacent shaft 12 by the motor 11a. When the shaft 12 is driven in the manner just set forth, current to the motor 14 is cut off. It will be observed that the sprocket 11b may be of sectional form, whereby different size sprockets may be employed to increase or decrease the speed of the shaft 12, and an adjustable idler (not shown) for the chain 11c may be provided to insure its operative relation to the sprockets.

As will be understood from the foregoing description, when the rolls are in non-rolling position (see Figs. 1, 12, 18) their apices coincide with a center which is common to the roll mountings and their work engaging faces are in engagement; and when the rolls are adjusted axially their apices traverse lines or planes which are radii of said center. It therefore follows that, whether the roll set consists of three or more rolls, each face on each roll and the adjoining face of the adjacent roll must be disposed at angles which equal the angular relation of said adjacent rolls. For example, as shown in Fig. 3a, the rolls 6 are disposed at 90° angles and each face 6a and the adjacent face 6a' are disposed at 45° angles, which equal a 90° angle; likewise, in Fig. 17, the sum of the angles of the adjoining faces $g$—$j'$, $g'$—$h$, $h'$—$i$, $i'$—$j$, respectively, is 90°, the angular relation of the rolls 29, 29a, 30, 30a.

As already set forth, the cross sectional shape of certain products require the adjustment of the rolls varying distances. This application of the invention is illustrated in Fig. 17 where the rolls have been adjusted axially and their apices have been moved on radii of the center $x$ along imaginary planes $x'$, $x''$, coincident with the apices of the rolls 29—30 and 29a—30a, respectively. As shown, the rolls 29a—30 have been adjusted a greater distance than that of the rolls 29—30a. To provide for these adjustments, the threads in the blocks 15a related to the rolls 29a—30 have a lead greater than the lead of the threads of the blocks related to the rolls 29—30a, these respective leads being co-ordinated, whereby the rotation of the shafts 12 will effect the desired roll adjustment.

It will also be apparent that the stock may be continuously supplied to the rolls, as shown in Fig. 11 or supplied in lengths, such as rods and bars or bodies such as ingots.

In view of the fact that the adjusting shafts for the rolls are simultaneously driven and rotated, an equal number of revolutions and provision is made to vary the roll adjustment by means interposed between each shaft and the roll related thereto, the construction and the driving means for these shafts, whereby roll adjustment is effected, is materially simplified.

It will be understood that the size of the stock, whether supplied continuously, in long or short sections or as bodies (such as ingots) and shape of the product to be produced, will determine the construction of the roll supporting frame, size of the work engaging rolls and other parts of the mill.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In a mill, the combination with a frame, of a set of rolls the corresponding sides of which terminate in upwardly and inwardly inclined faces adapted to simultaneously engage work, angularly related shafts, each of said rolls being fixed to one of said shafts intermediate the ends of the latter and supporting said roll in work engaging relation, supports on said frame extending inwardly between said rolls, pairs of alined bearings mounted on said supports, each pair of bearings slidably supporting the opposite ends of one of said shafts, pairs of aligned gears mounted in said supports, each of said gears meshing with the adjacent gear of the adjoining pair and one of said gears of each pair being drivingly connected to one of said shafts, means for driving one of said shafts, ways on said frame, each related to one of said rolls and disposed parallel to the axis thereof, a device slidably mounted on each way and operatively connected to the adjacent shaft for adjusting the roll thereon axially, the opposite ends of each device slidably engaging the adjacent ends of adjoining devices to permit relative movement therebetween, each end of each device and the adjacent end of the adjoining device being disposed in a plane coincident with the plane of the work engaging face of the roll related to one of said adjoining devices, a shaft disposed parallel to each of said devices, driving connections between the opposite ends of each of said last mentioned shafts and the adjacent ends of adjoining shafts, removable gear elements between each of the last mentioned shafts and the adjacent device for moving it on the adjacent way, and means for driving one of the last mentioned shafts.

2. A mill as claimed in claim 1 wherein driving connections are provided between the driving means for the first mentioned driven shaft and the last mentioned driven shaft.

3. In a mill, the combination with a frame, of a set of rolls the corresponding sides of which respectively terminate in upwardly and inwardly inclined faces adapted to simultaneously engage work, angularly related shafts, each of said rolls being fixed to one of said shafts intermediate the ends of the latter and supporting said roll in work engaging relation, supports on said frame extending between adjoining rolls, pairs of aligned bearings mounted on said supports, each pair of bearings slidably supporting the opposite ends of one of said shafts, pairs of aligned gears mounted in said supports, each of said gears meshing with the adjacent gear of the adjoining pair and one of said gears of each pair being drivingly connected to one of said shafts, means for driving one of said shafts, ways on said frame each related to one of said rolls and disposed parallel to the axis thereof, a separate shaft mounted on said frame parallel to each of said ways, a device slidably mounted on each way and operatively connected to the adjacent shaft to adjust the roll thereon axially, the opposite ends of said device slidably engaging the adjacent ends of adjoining devices to permit relative movement therebetween, each end of each device and the adjacent end of the adjoining device being disposed in a plane coincident with the plane of the work engaging face of the roll related to one of said adjoining devices, driving connections between the opposite ends of each of said separate shafts and the ends of adjoining separate shafts, gear elements between each of said last mentioned shafts and the adjacent device for moving the latter endwise on the adjacent way, and means for driving one of the last mentioned shafts.

4. A mill as claimed in claim 3 wherein the gear elements between each of said last mentioned shafts and the adjacent device are removable.

5. In a mill, the combination with a frame, of a set of rolls the opposite sides of which respectively terminate in upwardly and inwardly inclined faces, corresponding faces of which are adapted to simultaneously engage work, angularly related shafts, each of said rolls being fixed to one of said shafts intermediate the ends of the latter and supporting said roll in work engaging relation, supports on said frame extending inwardly between adjoining rolls, pairs of aligned bearings mounted on said supports, each pair of bearings slidably supporting the opposite ends of one of said shafts, pairs of aligned gears mounted in said supports, each of said gears meshing with the adjacent gear of the adjoining pair and one of said gears of each pair being drivingly connected to one of said shafts, means for driving one of said shafts, ways on said frame each related to one of said rolls and disposed parallel to the axis thereof, a separate shaft mounted on said frame parallel to each of said ways, a device slidably mounted on each way and operatively connected to the adjacent shaft to adjust the roll thereon axially, the opposite ends of each device slidably engaging the adjacent ends of adjoining devices to permit relative movement therebetween, each end of each device and the adjacent end of adjoining device being disposed in a plane coincident with the plane of one of the faces of the roll related to one of said adjoining devices, driving connections between the opposite ends of each of said separate shafts and the ends of adjoining separate shafts, gear elements between each of said separate shafts and the adjacent device for moving the latter endwise on the adjacent way, and means for driving one of the last-mentioned shafts.

6. In a mill, the combination with a frame, of a set of members each consisting of a shaft and a work engaging roll fixed to said shaft intermediate its ends, said shafts being disposed in a common plane and in an angular relation, the periphery of each roll consisting of active faces inclined upwardly and inwardly relative to its opposite sides, a way on said frame disposed parallel to each of said roll shafts, a device movable on each way and provided with an inwardly extending element engaging the adjacent member to move it laterally and adjust the roll thereof axially, each movable device having end walls slidably engaging the adjacent end walls of adjoining devices for relative movement therewith during movement of said devices, each end of each device and the adjacent end of the adjoining device being disposed in a plane coincident with the plane of one of the faces of the roll related to one of said adjoining devices, a separate shaft mounted in said frame and extending parallel to each of said movable devices, driving connections between each of said last-mentioned shafts and the adjacent movable device for moving the latter endwise, gearing between the opposite ends of each of the last-mentioned shafts and the adjacent ends of adjoining shafts, a motor having driving connections with one of said last-mentioned shafts for simultaneously driving the latter, pairs of aligned gears spacedly supported by said frame and keyed to and slidably supporting the opposite ends of said roll shafts, respectively, each gear at one end of each roll shaft meshing with the gear at the adjacent end of the adjoining roll shaft, and driving means connected to one of said gears for rotating it, whereby all of said gears are driven.

RICHARD E. RUMMINS.

REFERENCES CITED

The following references are of record in the file of this patent:

UNITED STATES PATENTS

| Number | Name | Date |
|---|---|---|
| 1,025,078 | Vassen | Apr. 30, 1912 |
| 1,429,311 | Albiez | Sept. 19, 1922 |
| 1,606,875 | Heinauer | Nov. 16, 1926 |

FOREIGN PATENTS

| Number | Country | Date |
|---|---|---|
| 15,403 | Great Britain | Aug. 12, 1893 |
| 79,190 | Germany | Jan. 24, 1895 |